March 16, 1948. E. HEKMAN ET AL 2,437,816
STEERABLE VEHICLE RUNNING GEAR
Filed July 24, 1944 3 Sheets-Sheet 2

Inventors
Edsko Hekman
Louis H. Hekman
By Liverance and
Van Antwerp
Attorneys.

Patented Mar. 16, 1948

2,437,816

UNITED STATES PATENT OFFICE 2,437,816

STEERABLE VEHICLE RUNNING GEAR

Edsko Hekman and Louis H. Hekman, Grand Rapids, Mich., assignors to Henri W. Jonkhoff, New York, N. Y.

Application July 24, 1944, Serial No. 546,233

20 Claims. (Cl. 280—48)

This invention relates to a novel and particularly effective running gear for vehicles and in which a steering of the vehicle is accomplished in a ready, simple and effective manner and with the application of a minimum of force. The running gear is useful in many relations. It has been applied, as in the disclosure of the present invention, to baby carriages but is not to be limited solely to such one place of use. But previously in baby carriages endeavors to accomplish easy steering movements have been unsuccessful and in general a change of direction has been by tilting the carriage upwardly to lift the front wheels and turning it on the rear wheels.

With the present invention the change of direction is by a slight lateral pressure against the handles of the carriage, whereupon a quick and immediate alteration in the position of the wheels of the running gear occurs with the desired change in direction following. It of course is apparent that in many other vehicles operated in a similar manner, as an example, factory trucks which are pushed from behind, being equipped with an upwardly extending handle usually consisting of tubular construction having spaced apart vertical legs connected by a horizontal cross bar, the same attainment of a change of direction by use of the novel running gear is as readily accomplished as in the illustrative type shown in the drawings.

The present invention, by means of which easy and very effective steering or change of direction may be accomplished, may be understood from the following description taken in connection with the accompanying drawings, in which, Fig. 1 is a side elevation showing the adaptation and the connection of the running gear at the under side of a baby carriage body.

Like reference characters refer to like parts in the different figures of the drawings.

The body 1 of the carriage may be the body of any suitable vehicle and in conjunction with the carriage there is provided the usual rearwardly and upwardly extending handle structure 2 for pushing it.

Figure 4:
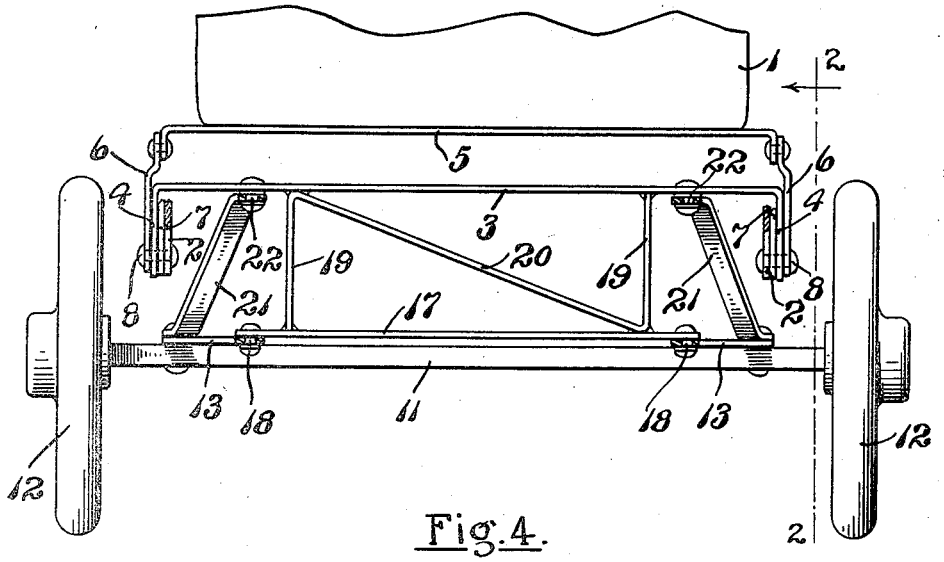
Fig. 4 is a somewhat enlarged vertical section substantially on the plane of line 4—4 of Fig. 3.

The running gear which is applied comprises a flexible quadrangular or isosceles-trapezoidal frame which includes in its construction a horizontal transverse bolster embodying a flat upper bar 3 which as shown at each end is turned downwardly to provide vertical legs 4. In attaching a baby carriage body 1 in place, a bar 5 is secured to the under side of the body at each end having turned down ears and is connected by links 6 which at their upper ends have a joinder to the ears at the ends of the bars 5 and at their lower ends are connected to the downturned legs 4 of the bar 3 at the outer sides thereof. The sides of the handles 2 extend diagonally downward to and within said downturned legs 4, and diagonal braces 7 connected at their upper ends to the vehicle body 1 extend downwardly and to the rear and at their lower ends are connected, together with the lower ends of the sides 2 of the handle and the lower ends of the links 6, by the same pins 8 as best shown in Fig. 4.

Figure 5:
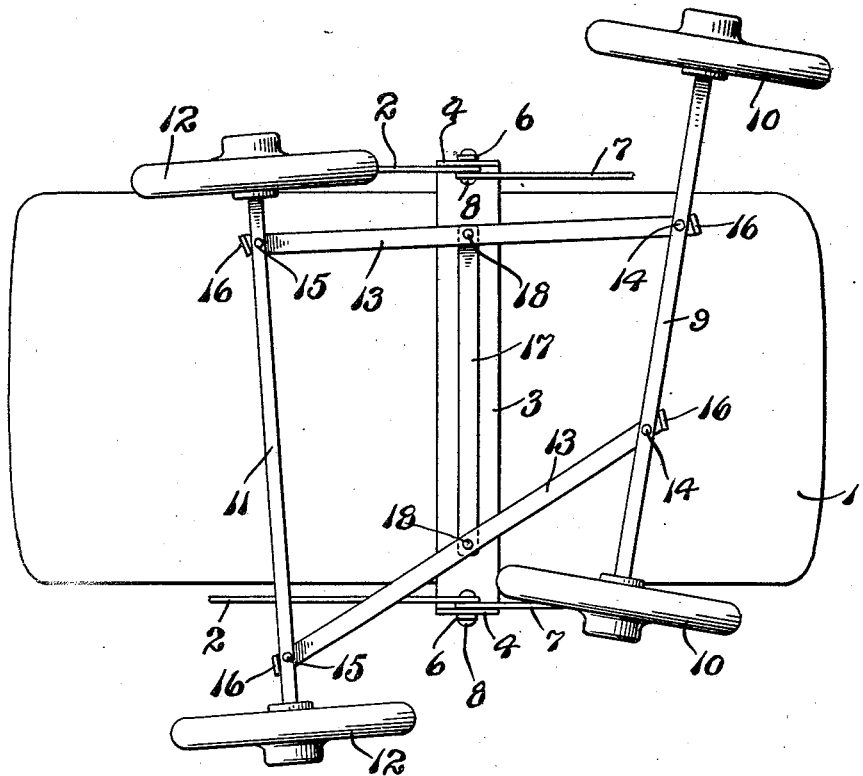
Fig. 5 is very similar to Fig. 3 with the running gear in a different position or one that it takes when a change of direction occurs.

A front non-rotative axle 9 is equipped at its ends with wheels 10 to turn about the longitudinal axis of the axle and a similar rear axle 11 is similarly equipped with rear wheels 12. Two side bars or reaches 13 extend between and are connected with the axles 9 and 11, having pivotal connections as shown at 14 to the front axle 9 and pivotal connections 15 to the rear axle. Each of the bars 13 in practice is provided at its ends with a downturned ear 16. The bars 13 converge toward the front so that the connections at 14 are spaced a lesser distance apart than the connections at 15. The ears 16 serve as stops to limit the extent of relative pivotal movement of the axles 9 and 11 and the side bars 13, as illustrated in Fig. 5.

Figure 1:
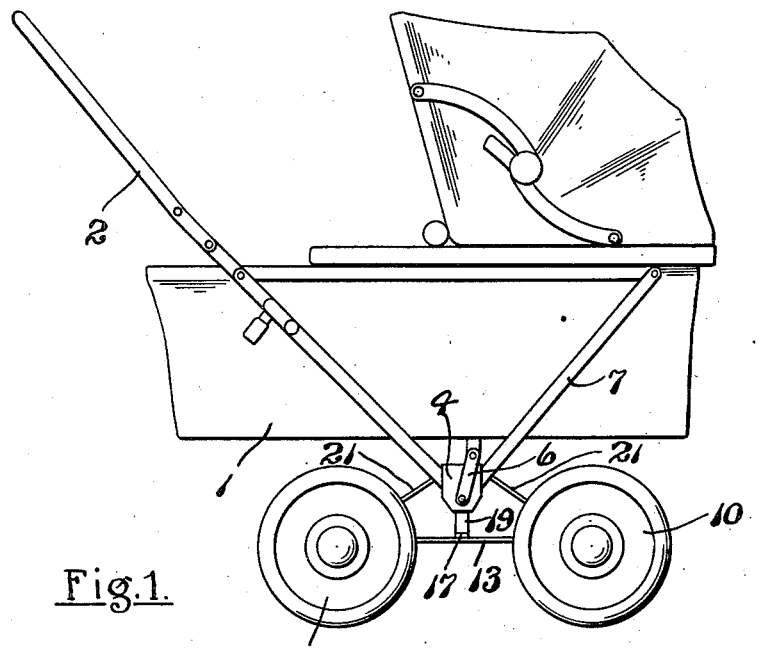
Figure 2:
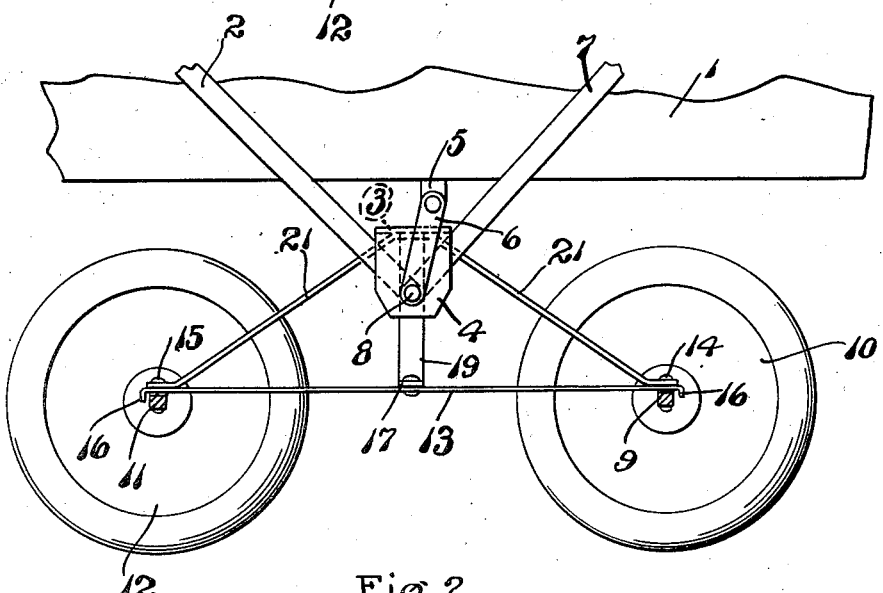
Fig. 2 is a fragmentary side elevation and section, the section being upon the plane of line 2—2 of Fig. 4.
Figure 3:
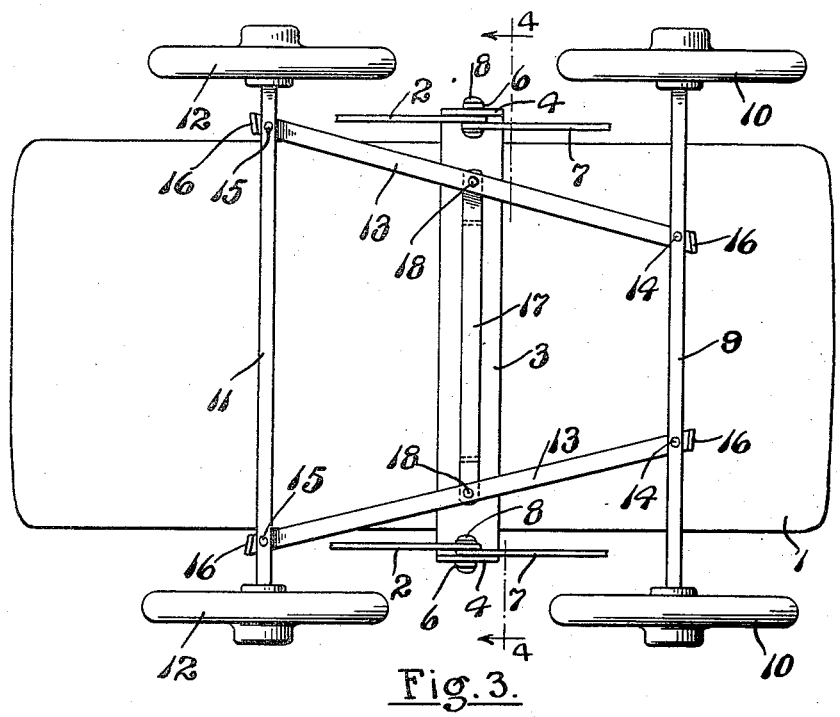
Fig. 3 is an under plan view.

The running gear also includes a lower transverse bar 17, and the bars 13 are connected substantially midway between their ends and directly underneath the transverse bar 3 by this bar 17, which at its ends is pivoted at 18 to the side bars 13. The bar 17 of the bolster is permanently and substantially rigidly connected to the bar 3 of the bolster by an intervening brace or truss construction which in practice is made from a single length of metal bent into a Z-shape, having vertical legs 19 and a diagonal connecting section 20 between said legs permanently welded or otherwise secured to the upper side of bar 17 and the lower side of bar 3 (Fig. 4). Two additional bars 21 are bent between their ends into the shape best shown in Fig. 2, with their center sections located underneath the bar 3 and pivotally secured thereto by pivots 22, the axes of the pivots 18 and 22 being in direct vertical alinement. From said center section downwardly inclined sections extend substantially to the ends of the bars 13 and are secured by the pivots 14 and 15 previously described. The bars form inverted V-shaped or arched braces between the bar 3 and the ends of the bars 13 and said bars 13 and 21 provide a substantially triangular truss at each side of the frame and each of said trusses as a unit may be turned about the common axes of the pivots 18 and 22 from the position as shown in Fig. 3 to that shown in Fig. 5 or to any intermediate position between.

The construction described provides a wheeled undercarriage for supporting the vehicle body in which the bars 13 and axles 9 and 11 form a flexible quadrangular or isosceles-trapezoidal frame which is capable of being transformed by lateral pressure on the body or bar 3 to shift the axles and wheels to steer the vehicle, which movement of the body or of the bar 3 relative thereto is permitted by the flexibility of the linkage formed by the front and rear portions or arms of the bars 13 and their pivotal connections with the bar 3 and the axles whereby a lateral swing of the bars 13 in one direction or the other is caused to change the positions of the wheels for steering actions.

With the construction described, the vehicle, a baby carriage as illustrated, may be pushed in a straight ahead direction in which the wheels 10 and 12 are alined, or by exerting a very slight lateral force against the upper ends of the handle at 2, such frame or under-carriage structure may be shifted from a straight ahead position to one in which it is transformed to shift the wheels so that they will follow a curved path. In Fig. 5 the extreme change in position of the wheels 10 and 12 and the axles on which they are mounted with respect to each other is shown. It is however apparent that a lesser change of position may be accomplished by exerting the lateral pressure on the handles 2 for a shorter time and to a lesser degree so as to occupy some intermediate position from those shown in Figs. 3 and 5.

The truss structures described freely turn about the vertical axes of the alined pins 18 and 22, and the axles 9 and 11 will be correspondingly changed in position by a relative pivotal movement about the pivots 14 and 15 and this without any lateral thrust occurring between the wheels 10 and 12 and their respective axles. The body is held against tipping either forwardly or to the rear by the engagement of the lower ends of the bars 7 and those extending downwardly from the handle structure 2 against the front and rear edges respectively of the transverse bar 3.

The construction as described, in thorough test and trial has proved particularly effective, and easily operable. It is economical to produce.

The invention is defined in the appended claims and is to be considered comprehensive of all forms of structure coming within their scope.

We claim:

1. A vehicle running gear comprising, a bolster adapted to be secured transversely at the under side of a vehicle body, side bars pivotally mounted between their ends on the bolster to swing laterally of the vehicle, axles located one in front and one back of said bolster, arched longitudinal braces pivoted intermediate their ends to the bolster and extending therefrom toward the axles, and pivotal connections between said axles and the ends of the side bars and ends of the braces adapting said braces to swing with the side bars.

2. In a structure as described, a vehicle body, handle means connected to the body extending upwardly at the rear thereof, a running gear underneath the body comprising a transverse bolster secured underneath the lower side of the body, side bars pivotally mounted between their ends on the bolster adjacent the sides of the vehicle body, front and rear axles disposed transversely of the body, arched longitudinal braces pivoted intermediate their ends to the bolster and extending therefrom toward the axles, pivotal connections between the front ends of the side bars and braces and the front axle and the rear ends of said side bars and braces and the rear axle adapting said braces to swing with the side bars.

3. A construction containing the elements defined in claim 2, and stop means for limiting the extent of relative pivotal movement of the axles and said side bars to which the axles are pivotally connected.

4. In a construction as described, a vehicle body, a running gear underneath the body comprising, a transverse bar secured to and underneath the under side of the body between its ends, horizontal side bars pivotally connected between their ends to and adjacent opposite ends of the transverse bar to swing laterally of the vehicle, non-rotative horizontal axles located one in front of the transverse bar and the other back thereof, pivotal connections between said axles and the end portions of said side bars, means for limiting the relative pivotal movement of the axles and side bars with respect to each other, arched longitudinally extending braces pivoted between their ends to the transverse bar, pivotal connections between the axles and the ends of the braces adapting said braces to swing with the side bars and means connected with said vehicle extending upwardly at the rear portion thereof for pushing the vehicle on said running gear and for changing the direction of movement thereof by lateral pressure against said means.

5. A construction as defined in claim 4, said side bars converging toward each other from their rear to the front ends, the distance between the pivotal connections of said bars with the front axle being less than the distance between the pivotal connections of the rear ends of the bars to the rear axle.

6. In a construction as described, a vehicle body, a transverse bar of flat metal secured at the under side of said vehicle body between its front and rear ends, said transverse bar at its ends having downwardly extending legs, bracing means connected to the legs and extending upwardly and forwardly to and connected at its forward portions to said vehicle body, handle means for imparting ambulatory motion to and guiding said body connected to said legs at one end and extending upwardly and to the rear of the vehicle body, two side bars spaced from each other located underneath the transverse bar adjacent opposite ends thereof, means for pivotally connecting said side bars at points between their ends to said transverse bar, front and rear horizontal non-rotative axles located one in front of the transverse bar and the other to the rear thereof and in a plane below said transverse bar, and pivotal connections between the front end portions of said side bars and the front axle and the rear end portions of said side bars and the rear axle.

7. A construction as defined in claim 6, said side bars converging toward each other from their rear to their front ends, the pivotal connections between the front portions of said side bars and the front axle being closer together than the pivotal connections of the rear portions of the side bars to the rear axle, said side bars lying over and resting at their front and rear end portions upon the front and rear axles, and stop means connected to said side bars at their front and rear ends extending downwardly a short distance in front of said front axle and back of said rear axle permitting pivotal movement of the side bars with respect to said transverse bar and pivotal movement of said side bars and said axles but stopping said movement at two maximum predetermined positions.

8. In a construction as described, a vehicle body, a running gear underneath said vehicle body comprising, a transverse bar secured to and below the under side of said body between its front and rear ends, two side bars located underneath and spaced from said transverse bar one adjacent each end of the transverse bar, truss members having end portions engaging against and at the upper sides of said side bars adjacent the ends thereof, said truss portions having upwardly and forwardly extending rear sections and upwardly and rearwardly extending front sections extending to and underneath the transverse bar, pivots passing through said truss portions and said transverse bar, a connecting bar located underneath and parallel to said transverse bar, pivotal connections between the ends thereof and said side bars, said pivotal connections having vertical axes in substantial coincidence with the axes of said pivots connecting the truss members to said transverse bar, means permanently securing said connecting bar to the transverse bar, front and rear axles located transversely of and underneath the body, the end portions of said side bars and said truss members lying over said axles, vertical pivots extending through the ends of said truss members, side bars and axles, and wheels rotatably mounted on the ends of the axles.

9. A construction as defined in claim 8, and means connected with the body manually engageable at the rear of said body and above said running gear for pushing the vehicle in a forward direction and for changing its direction of movement by lateral pressure against said pushing means.

10. A construction as defined in claim 8, said side bars and the truss members located thereover converging toward each other from their rear to their front ends, the pivotal connections connecting them with the front axle being closer together than the pivotal connections connecting them to the rear axle, and stop means interposed between said axles and side bars for limiting the extent of relative movement of the side bars and axles to each other.

11. In a structure as described, a vehicle body and a running gear underneath the body comprising a transverse bolster secured underneath the lower side of the body, side bars pivotally mounted between their ends on the transverse bolster to turn about vertical axes, said vertical axes being adjacent the sides of the vehicle body, front and rear non-rotative axles disposed transversely of the body, arched longitudinal braces pivoted between their ends to the bolster, pivotal connections between the front ends of the side bars, the front ends of the arched braces and the front axle, and pivotal connections between the rear ends of said side bars, the rear ends of the arched braces and the rear axle, the axes of said pivots being vertically disposed.

12. In a construction as described, a vehicle body, a bolster pivotally supported from and at the underside of said vehicle body between its front and rear ends, said bolster including a transverse bar having downwardly extending legs at its ends, bracing means connected to the legs and extending upwardly and forwardly to and connected at its forward portions to said vehicle body, handle means for pushing and guiding said body connected to said legs at one end and extending upwardly and to the rear of the vehicle body, two side bars spaced from each other located underneath the transverse bar adjacent opposite ends thereof, means for pivotally connecting said side bars at points between their ends to the bolster, front and rear horizontal axles located one in front of the transverse bar and the other in rear thereof and in a plane below said transverse bar, and pivotal connections between the front end portions of said side bars and the front axle and the rear end portions of said side bars and the rear axle.

13. In a structure as described, a vehicle body, and a running gear underneath the body comprising a bolster secured underneath the lower side of the body and including an upper transverse bar and a lower transverse bar, side bars pivotally mounted between their ends on the lower transverse bar of the bolster adjacent the sides of the vehicle body to swing laterally of the body, front and rear axles disposed transversely of the body, arched longitudinal braces pivoted between their ends to the bolster, pivotal connections between the front ends of the side bars, the front ends of the arched braces and the front axle, and pivotal connections between the rear ends of said side bars, the rear ends of the arched braces and the rear axle.

14. In a construction as described, a vehicle body, a transverse bolster secured at the underside of said vehicle body between its front and rear ends, said bolster including upper and lower transverse bars, the upper transverse bar having downwardly extending legs at its ends, bracing means connected to the legs and extending upwardly and forwardly to and connected at its forward portions to said vehicle body, handle means for pushing and guiding said body connected to said legs at one end and extending upwardly and to the rear of the vehicle body, two side bars spaced from each other located underneath the upper transverse bar adjacent opposite ends thereof, longitudinally extending arched braces pivotally connected between their ends to the upper transverse bar, means for pivotally connecting said side bars at points between their ends to said lower transverse bar, front and rear horizontal axles located one in front of the bolster and the other in rear thereof and in a plane below said upper transverse bar, and pivotal connections between the front end portions of said side bars and front ends of the arched braces and the front axle and between the rear end portions of said side bars, the rear ends of the arched braces and the rear axle.

15. In a construction as described, a vehicle body, and a running gear underneath said vehicle body comprising a transverse bolster secured to and below the underside of said body between its front and rear ends, said bolster including an upper transverse bar, a lower transverse bar and a Z-shaped bolster uniting said bars, two side bars located one adjacent each end of the lower transverse bar, truss members having end portions engaging against and at the upper sides of said side bars adjacent the ends thereof, said truss members having upwardly and forwardly extending rear sections and upwardly and rearwardly extending front sections and being pivotally connected intermediate their ends to the upper transverse bar of the bolster, pivotal connections between the intermediate portions of the side bars and the lower transverse bar of the bolster, said pivotal connections having vertical axes in substantial coincidence with the axes of said pivots connecting the truss members to said upper transverse bar of the bolster, front and rear axles located transversely of and underneath the body, the end portions of said side bars and said truss members lying over said axles, and vertical pivots extending through the ends of said truss members, side bars and axles.

16. In a construction as described, a vehicle body, and a running gear underneath said vehicle body comprising, a transverse bolster secured to and below the underside of said body between its front and rear ends, two side bars located underneath one adjacent each end of the transverse bar, truss members having end portions engaging against and at the upper sides of said side bars adjacent the ends thereof, said truss members having upwardly and forwardly extending rear sections and upwardly and rearwardly extending front sections and being pivotally connected intermediate their ends to the bolster, a connecting bar located underneath and parallel to said transverse bar, pivotal connections between the ends thereof and said side bars, said pivotal connections having vertical axes in substantial coincidence with the axes of said pivots connecting the truss members to said transverse bar, front and rear axles located transverse of the body, the end portions of said side bars and said truss members lying over said axles, and vertical pivots extending through the ends of said truss members, side bars and axles.

17. In a construction as described, a vehicle body, and a running gear underneath said vehicle body comprising, a transverse bolster secured to and below the underside of said body between its front and rear ends, two side bars located one adjacent each end of the bolster, longitudinally extending truss members having end portions engaging against and at the upper sides of said side bars adjacent the ends thereof, said truss members having upwardly and forwardly extending rear sections and upwardly and rearwardly extending front sections and being pivotally connected between their ends to the bolster, pivotal connections between the ends of the bolster and said side bars, said pivotal connection having vertical axes, front and rear axles located transversely of the body, the end portions of said side bars and said truss members lying over said axles, and vertical pivots extending through the ends of said truss members, side bars and axles.

18. In a vehicle, a body, and a wheeled carriage for supporting said body, comprising a body supporting member, a flexible quadrangle consisting of front and rear parallel cross wheel axle members and longitudinal side members pivotally connecting the front and rear axle members and pivoted intermediate their ends to the body supporting member, whereby the quadrangle can be transformed when the pivot points of the longitudinal members are moved ahead of the other longitudinal member, and arched longitudinal braces intermediately pivoted to the body supporting member and at their ends to the front and rear axle members.

19. In a vehicle, a body, and a wheeled carriage for supporting said body, comprising a body supporting member, a flexible quadrangle consisting of front and rear parallel cross wheel axle members and longitudinal side members pivotally connecting the front and rear axle members and pivoted intermediate their ends to the body supporting member, said side members being disposed in angular position relative to each other and having their front axle pivots differentially arranged whereby the quadrangle can be transformed when the pivot points of the longitudinal members are moved ahead of the other longitudinal member, and arched longitudinal braces intermediately pivoted to the body supporting member and at the ends to the front and rear axle members.

20. In a vehicle, a body, and a wheeled carriage for supporting said body, comprising a body supporting member, a flexible quadrangle consisting of front and rear parallel cross wheel axle members and longitudinal side members pivotally connecting the front and rear axle members and pivoted intermediate their ends to the body supporting member, said side members extending at converging angles between the front and rear axle members and having their front axle pivots arranged closer together than their rear axle pivots, whereby the quadrangle can be transformed when the pivot points of the longitudinal members are moved ahead of the other longitudinal member, and arched longitudinal braces intermediately pivoted to the body supporting member and at their ends to the front and rear axle members.

EDSKO HEKMAN.
LOUIS H. HEKMAN.

REFERENCES CITED

The following references are of record in the file of this patent:

UNITED STATES PATENTS

| Number | Name | Date |
|---|---|---|
| 233,503 | Greenleaf | Oct. 19, 1880 |
| 412,740 | Fax | Oct. 15, 1889 |

FOREIGN PATENTS

| Number | Country | Date |
|---|---|---|
| 10,927 | Great Britain | 1888 |